(12) United States Patent
Boucherie

(10) Patent No.: US 6,315,103 B1
(45) Date of Patent: Nov. 13, 2001

(54) METHOD AND DEVICE FOR ARRANGING TOOTHBRUSH BODIES AND MACHINE EQUIPPED WITH SUCH DEVICE

(75) Inventor: Bart Gerard Boucherie, Izegem (BE)

(73) Assignee: Firma G.B. Boucherie nv, Izegem (BE)

( * ) Notice: Subject to any disclaimer, the term of this patent is extended or adjusted under 35 U.S.C. 154(b) by 0 days.

(21) Appl. No.: 09/373,656

(22) Filed: Aug. 13, 1999

(30) Foreign Application Priority Data

Aug. 24, 1998 (BE) .................................................. 09800623

(51) Int. Cl.[7] .................................................. B65G 47/24
(52) U.S. Cl. ................................................................ 198/395
(58) Field of Search ..................................... 198/395, 401

(56) References Cited

U.S. PATENT DOCUMENTS

| 3,506,840 | * | 4/1970 | Fink ...................................... 198/395 |
| 4,784,493 | | 11/1988 | Turcheck, Jr. et al. . |
| 4,909,376 | | 3/1990 | Herndon et al. . |
| 5,078,258 | * | 1/1992 | Van Der Schoot ................... 198/395 |
| 5,186,303 | | 2/1993 | Seto et al. . |
| 5,314,055 | | 5/1994 | Gordon . |
| 5,370,216 | * | 12/1994 | Tsuruyama et al. .................. 198/395 |
| 5,687,831 | | 11/1997 | Carlisle . |
| 5,845,759 | * | 12/1998 | Takada et al. ........................ 198/395 |
| 5,924,546 | * | 7/1999 | Funaya ................................. 198/395 |

FOREIGN PATENT DOCUMENTS

| 0 613 841 A1 | 9/1994 | (EP) . |
| 0 663 271 A2 | 7/1995 | (EP) . |
| 2 167 211 A | 5/1986 | (GB) . |

* cited by examiner

*Primary Examiner*—Douglas Hess
(74) *Attorney, Agent, or Firm*—Bacon & Thomas, PLLC

(57) ABSTRACT

Method for arranging toothbrush bodies, which toothbrush bodies (3) either or not are already provided with brush hair, characterized in that this method consists in supplying the toothbrush bodies (3) to be arranged; detecting the position of the supplied toothbrush bodies (3) by a visual recognition system (4); controlling a sorting element in function of the detections performed by the recognition system (4); and separating, by this sorting element, at least a number of the toothbrush bodies (3), as well as arranging them at least partially ordered in discharge means (6).

21 Claims, 3 Drawing Sheets

METHOD AND DEVICE FOR ARRANGING TOOTHBRUSH BODIES AND MACHINE EQUIPPED WITH SUCH DEVICE

BACKGROUND OF THE INVENTION

1. Field of the invention

This invention relates to a method and a device for arranging toothbrush bodies, as well as to a machine equipped with such device.

2. Description of the prior art

It is known that toothbrush bodies are produced by means of injection moulding in a mould. Hereby, the toothbrush bodies are ejected from the mould and collected in a non-oriented manner. In order to provide these toothbrush bodies subsequently with brush hair, they have to be supplied to a brush manufacturing machine one by one, in an ordered and correctly oriented manner.

The devices for arranging, more particularly, orienting, toothbrush bodies which are known up to now make use of the principle whereby the toothbrush bodies are set in motion in such a manner, for example, by means of stepwise arranged trays moving up and down, that a selection is performed due to gravity and the mutual contact between the toothbrush bodies, in such a manner that finally only toothbrush bodies are kept back which are oriented in the right direction. Examples thereof are described in the Belgian patents No. 894.577 and No. 1.003.803.

Although these known devices fulfil their purpose in a large number of applications, they will show problems in a number of other applications. This is the case, amongst others, when a number of oriented toothbrush bodies has to be made available with a high certainty in a short period of time. When applying the aforementioned tray system, it may happen that during a certain period of time, no toothbrush bodies will be presented at the exit. Furthermore, there is an increasing tendency of coating toothbrush bodies with a soft plastic or rubber, as a result of which these toothbrush bodies, due to the friction against the trays, may become jammed and therefore cause disturbances.

It is also known that finished toothbrushes often are collected at the discharge side of the toothbrush manufacturing machine in a non-oriented manner, after which the brushes, before packaging, have to be reoriented again.

SUMMARY OF THE INVENTION

In the first place, the invention aims at a method and device for arranging toothbrush bodies, either toothbrush bodies still to be filled which have to be supplied to a toothbrush manufacturing machine, or toothbrush bodies already provided with brush hair, thus, finished toothbrushes, which have to be packaged, which method and device allows to accomplish a fast arrangement, more particularly, an orientation, in a trouble-free manner and without necessitating a mutual contact between the toothbrush bodies. In the second place, it aims at a method and device with which, moreover, the aforementioned disadvantages of the tray system,-mentioned heretofore are excluded.

To this aim, the invention relates to a method for arranging toothbrush bodies, which toothbrush bodies either or not are provided with brush hair, with as a characteristic that this method consists in supplying the toothbrush bodies to be arranged; detecting the position of the supplied toothbrush bodies by means of a visual recognition system; controlling a sorting element in function of the detections performed by the recognition system; and separating, by means of this sorting element, at least a number of the toothbrush bodies, as well as arranging them at least partially ordered in discharge means.

By the visual detection of the position of the supplied toothbrush bodies, toothbrush bodies can always be detected with certainty and taken up from the supplied quantity in order to be subsequently laid down and transported off in a partially or entirely oriented manner. As arranging takes place on the basis of a visual recognition and the electronic processing of signals, the system can easily be adapted every time when toothbrush bodies of another shape have to be arranged, without necessitating a mechanical adaptation.

According to a first possibility, all detected toothbrush bodies are separated and oriented, or at least partially oriented, by the sorting element.

According to a second possibility, exclusively those toothbrush bodies which fulfil certain criteria, more particularly, certain conditions, in respect to their position, are separated by means of the sorting element. This second possibility offers the additional advantage that use can be made of a relatively simple sorting element, such as, for example, a manipulator with a limited number of motions.

For the recognition system, preferably use is made of an electronic vision system which is provided with a camera, which allows a very precise detection of the position of the toothbrush bodies.

The sorting element preferably consists of a manipulator, more particularly a robot which is provided with a gripper for taking up the toothbrush bodies.

According to a particular embodiment of the invention, the toothbrush bodies, after being separated by the sorting element, are further arranged in one or more separate devices. In these devices, the toothbrush bodies can be positioned, for example, with their handles in the same direction and/or all of them placed with their backside in the same direction. In such case, the sorting element only has to provide for that the toothbrush bodies are positioned with their longitudinal axis in one and the same direction, regardless of the sense of the handles and the direction into which the backside is facing, offering the advantage that the sorting element may be realized in a less complex manner.

According to a variant, one or more of the aforementioned operations actually will be realized by the sorting element which then, preferably, consists of a manipulator. On one hand, a more complex sorting element will then, of course, be necessary, but, on the other hand, then, the advantage is created that the number of devices for performing the additional orientation operations can be limited, as a result of which space is saved.

According to another particular form of embodiment, whereby for the sorting element preferably use is made of a manipulator, the toothbrush bodies are positioned in the correct end position exclusively by the manipulator, thus, without necessitating additional devices for further orientation. In this case, in the control of the manipulator criteria are applied in such a manner that exclusively such toothbrush bodies are separated by the manipulator which, by means of this manipulator, can be completely oriented up into the right end position, whereas the remaining toothbrush bodies are transported past the manipulator.

Preferably, the supplied toothbrush bodies to be arranged shall be supplied in such a manner that they are presented to the visual recognition system in small quantities and preferably substantially free from each other, as a result of which an easy recognition is made possible and it is also obtained that a larger number of toothbrush bodies per supplied quantity takes a position which allows that such toothbrush body can be taken up by a manipulator or such.

The toothbrush bodies which are not separated by the sorting element preferably are brought back into the sorting circuit by means of a closed circuit. Hereby, according to the invention, preferably an alteration of the orientation of these toothbrush bodies will be provided for before presenting them again to the recognition system.

In order to realize the method of the invention, it also relates to a device, the characteristics of which will become clear from the description following hereafter.

Further, the invention also relates to a toothbrush manufacturing machine equipped with such device, whereby this device then supplies arranged and/or oriented toothbrush bodies which have to be provided with brush hair.

The invention also relates to a toothbrush packaging machine equipped with such device, whereby this device provides for that the finished toothbrushes then are supplied to the entry of the toothbrush packaging machines in order to be finally packaged in a blister package or such.

BRIEF DESCRIPTION OF THE DRAWINGS

With the intention of better showing the characteristics of the invention, hereafter, by way of example without any limitative character, a preferred form of embodiment of a device according to the invention is described, with reference to the accompanying drawings, wherein.

DESCRIPTION OF PREFERRED EMBODIMENTS

Figure 1:
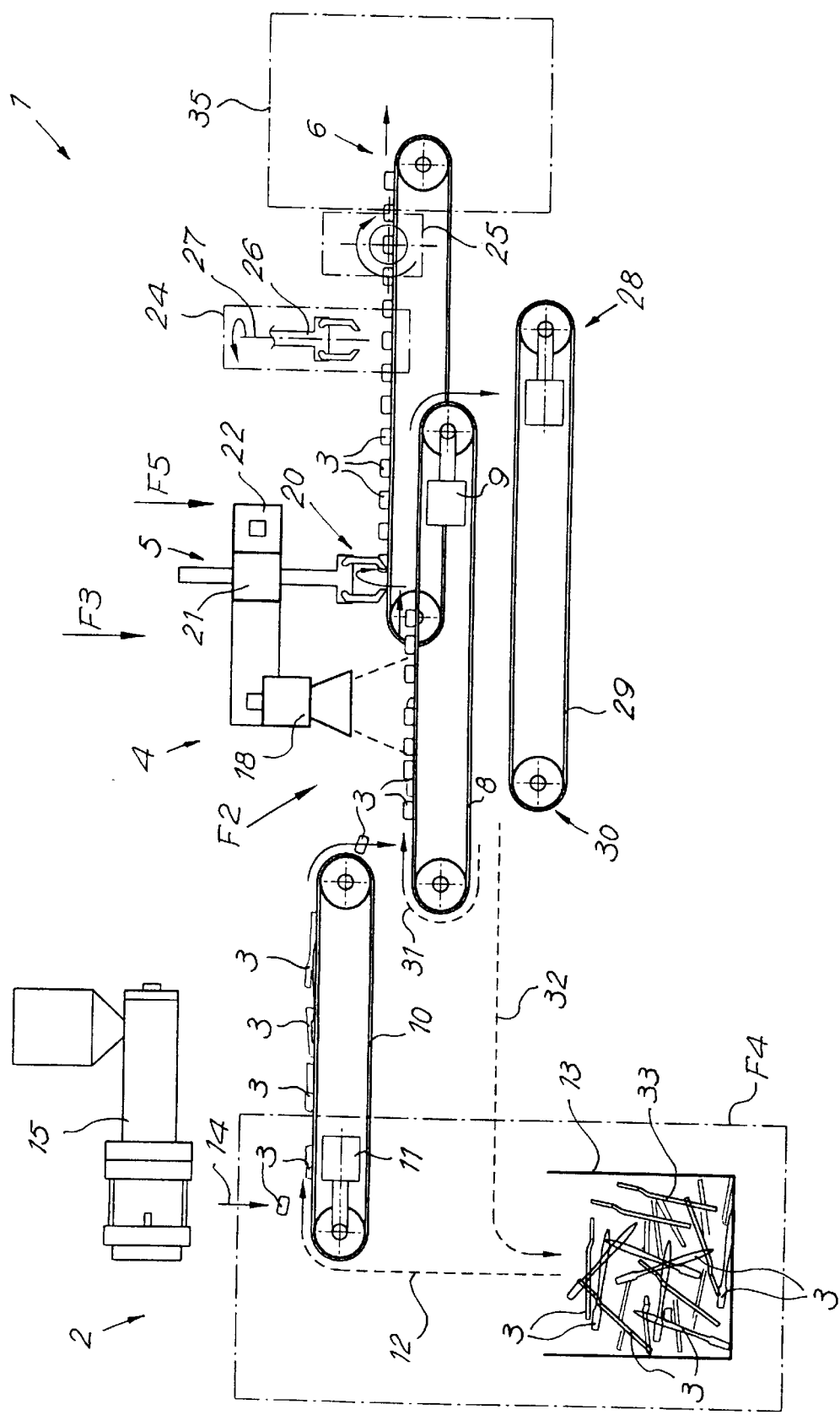
FIG. 1 schematically represents a device according to the invention.
Figure 2:
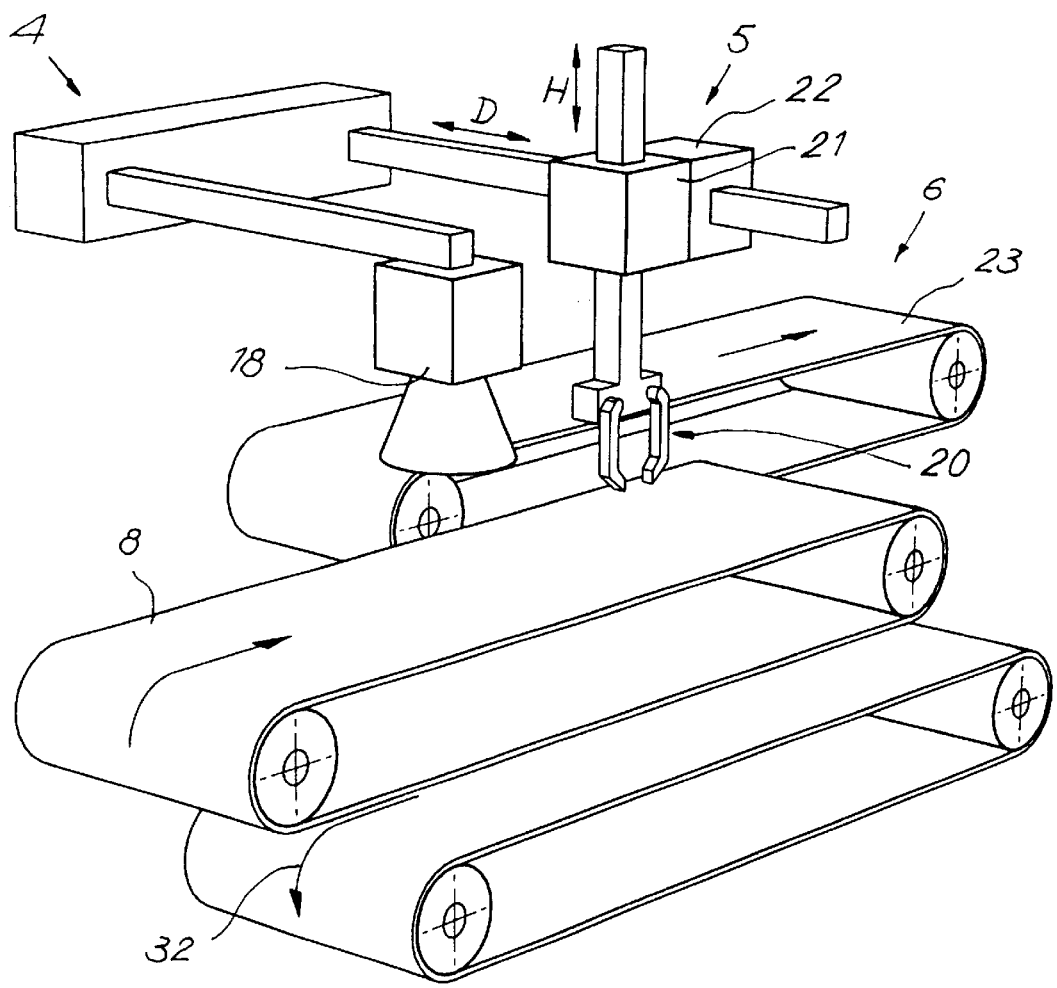
FIG. 2 in perspective represents a view according to arrow F2 in FIG. 1.
Figure 3:
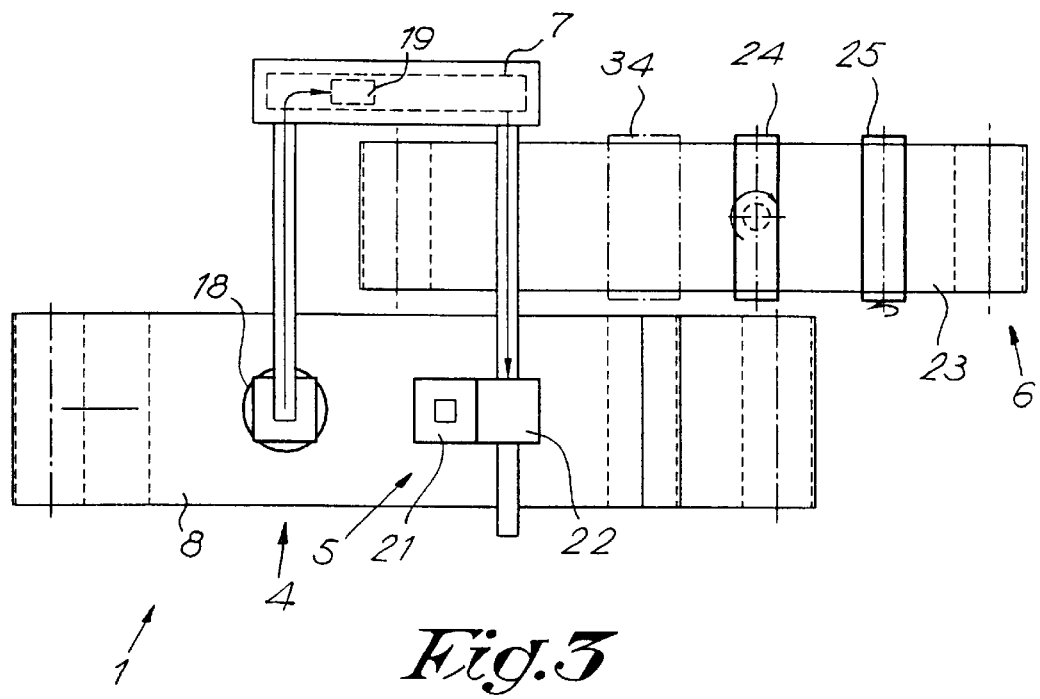
FIG. 3 schematically represents a view according to arrow F3 in FIG. 1.

According to FIGS. 1 to 3, the device 1 according to the invention substantially consists of supply means 2 for the toothbrush bodies 3 to be arranged; a visual recognition system 4 for detecting the position of the supplied toothbrush bodies 3; a sorting element, in this case, a manipulator 5; discharge means 6 for the arranged toothbrush bodies 3; and a control unit 7 for controlling the sorting element or, thus, the manipulator 5 in function of the detections performed by the recognition system 4, in such a manner that at least a certain number of the toothbrush bodies 3 is separated by the manipulator 5 and is presented to and/or provided in the discharge means 6 in an ordered manner.

The supply means 2 comprise transport means for feeding the toothbrush bodies 3 to be arranged successively along the recognition system 4 and the manipulator 5, which, in the represented example, consist of a transport conveyor 8 which is driven by means of a driving element 9 which, depending on the embodiment, either provides for a continuous drive, or for an intermittent drive of the transport conveyor 8, as further explained hereafter.

Further, the supply means 2 preferably also comprise means providing for that the toothbrush bodies 3 are supplied in such a manner that they are spread in small quantities and preferably substantially free from each other. In the example from FIG. 1, these means consist of a second transport conveyor 10 with which a bulk of toothbrush bodies 3 is supplied and disposed on the first transport conveyor 8 in reduced quantities, this by means of an appropriate control of the drive 11 of the transport conveyor 10. Hereby, the transport conveyor 10 can be controlled, for example, with an indexed movement, which means that it is controlled intermittently, in such a manner that each time only small quantities of toothbrush bodies 3 are disposed on the transport conveyor 8, where they spread. According to another possibility, the transport conveyor 10 may be driven continuously, whereas the transport conveyor 8 is driven at a higher speed.

As schematically represented by line 12, the toothbrush bodies 3 can be supplied from a bulk magazine 13 but can, as indicated by arrow 14, also be provided directly from a machine manufacturing the toothbrush bodies 3, such as a injection moulding machine 15.

Figure 4:
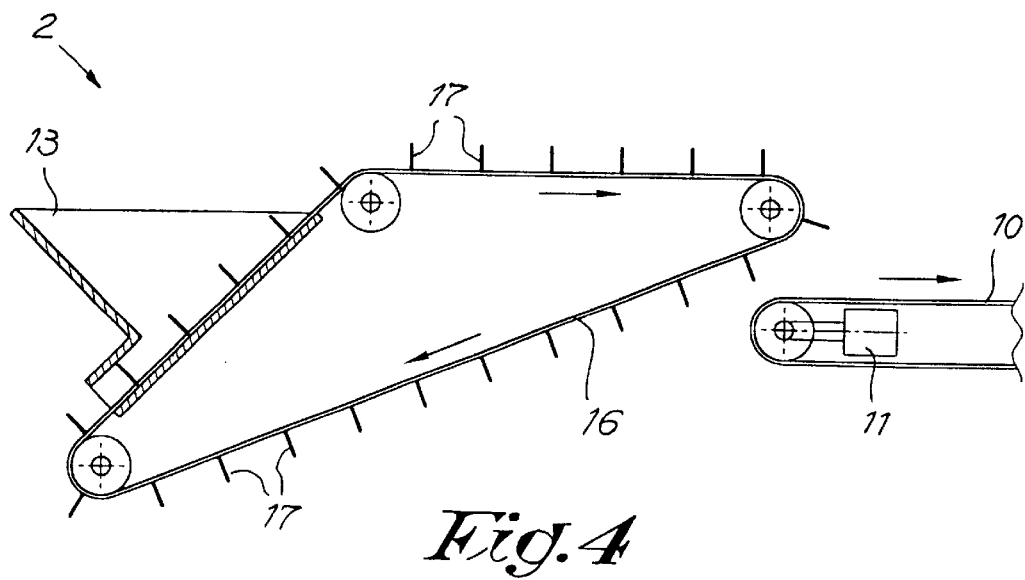
FIG. 4 represents a practical form of embodiment of the portion indicated by F4 in FIG. 1.

For taking the toothbrush bodies 3 out of the bulk magazine 13, any mechanism may be applied. An example of such mechanism is represented in FIG. 4 and consists of a transport conveyor 16 with carrier blades 17 which passes through the bulk magazine 13. This transport conveyor 16 can throw the toothbrush bodies 3 either onto the aforementioned transport conveyor 10, as represented, or replace the transport conveyor 10.

As a supply mechanism, it is also possible to use a vibratory feeding device which separates the brush bodies from a bulk magazine and drops them onto the transport conveyor 8.

The recognition system 4 consists of a camera 18 which is coupled to a processing unit 19 which may be integrated in the control unit 7 and which processes the detected images and, for example, compares them to a number of stored criteria in respect to the position of the detected toothbrush bodies 3.

The manipulator 5 is coupled to the recognition system 4 by means of the electronic control unit 7, in such a manner that only the toothbrush bodies 3 detected by the camera 18 which fulfil the predetermined criteria regarding their position are taken up in order to be presented to the discharge means 6 in an oriented manner.

In the represented example, this manipulator 5 consists of a gripper 20 which, in this case at the location where it has to take up the toothbrush bodies 3, substantially only can be opened and closed and positioned sidewards as well as moved up and down, but can not perform a rotating movement. In the represented example, these movements can be realized by means of drive means 21 for the upward and downward movements, drive means 22 in the form of a sley for the sideward movement, and not-represented drive means for opening and closing the gripper 20.

Preferably, the discharge means 6 consist at least of a transport mechanism 23, upon which or in which the arranged toothbrush bodies 3 can be provided systematically; in the represented example, this transport mechanism 23 is shown schematically as a simple transport conveyor, but in practice it will preferably be provided with holders, recesses, clamps or such for taking up and further holding the oriented toothbrush bodies 3 in the presented position.

According to a not-represented variant, the discharge means 6 may also be formed by a so-called "stack hopper" or so-called stack magazine. The manipulator 5 then places the oriented brush bodies in the stack magazine where they remain oriented.

As schematically indicated in FIGS. 1 to 3, the device 1, after the manipulator 5, may also comprise one or more mechanisms 24–25 which provide for an additional corrective orientation. The mechanism 24 consists of a rotatable element 26, such as a gripper, with which toothbrush bodies 3 can be taken up and rotated around an axis 27 perpendicular to their longitudinal axis. The mechanism 25 consists of an element, such as a rotatable clamp, with which the toothbrush bodies 3 can be rotated around their longitudinal axis L.

In order to prevent that always the same toothbrush bodies 3 are transported past the camera 18 without being removed by the manipulator 5, the device 1 is provided with means 28 with which the orientation of the toothbrush bodies 3 which have not been taken up is altered, which means 28 in this case consist of a third transport conveyor 29 situated below the transport conveyor 8, in such a manner that the toothbrush bodies 3 which reach the end of the transport conveyor 8, drop from this transport conveyor 8, such that, when arriving on the transport conveyor 29, generally they will be lying in a different position. From the end 30 of the transport conveyor 29, the toothbrush bodies 3, as indicated by arrow 31, are brought onto the transport conveyor 8 again, which can take place in any manner.

According to a variant, the toothbrush bodies 3 which have not been taken up, as indicated by arrow 32, may also be supplied back to the bulk magazine 13, as a result of which in this case, too, the circuit is closed and, at the same time, it is avoided that the toothbrush bodies 3 not taken up by the manipulator 5 will arrive on the transport conveyor 8 in the same manner again.

The functioning of the device 1 substantially is as follows.

The toothbrush bodies 3 are supplied by means of the second transport conveyor 10 and, by means of the appropriate drive of this transport conveyor 10, they are disposed on the transport conveyor 8 in minor quantities, after which the toothbrush bodies 3 disposed thereon are passed in front of the camera 18.

By means of this camera 18, it is determined in which manner the toothbrush bodies 3 are situated on the transport conveyor 8. The toothbrush bodies 3 with a position fulfilling certain criteria are taken up by the manipulator 5 and presented to the supply means 2. Hereby, the transport conveyor 8 preferably is brought to a standstill each time when a toothbrush body 3 to be removed has arrived under the manipulator 5.

The applied criteria may be of different kinds.

An important criterion which, according to the invention, preferably is applied, consists in that the toothbrush bodies 3 which are situated in such a manner that the longitudinal axis L thereof shows a direction which is parallel to a predetermined direction or shows only a certain angle deviation H, for example, of maximum 20°, in respect to this predetermined direction, are removed by the manipulator 5, whereas the remaining toothbrush bodies 3 are transported further.

Figure 5:
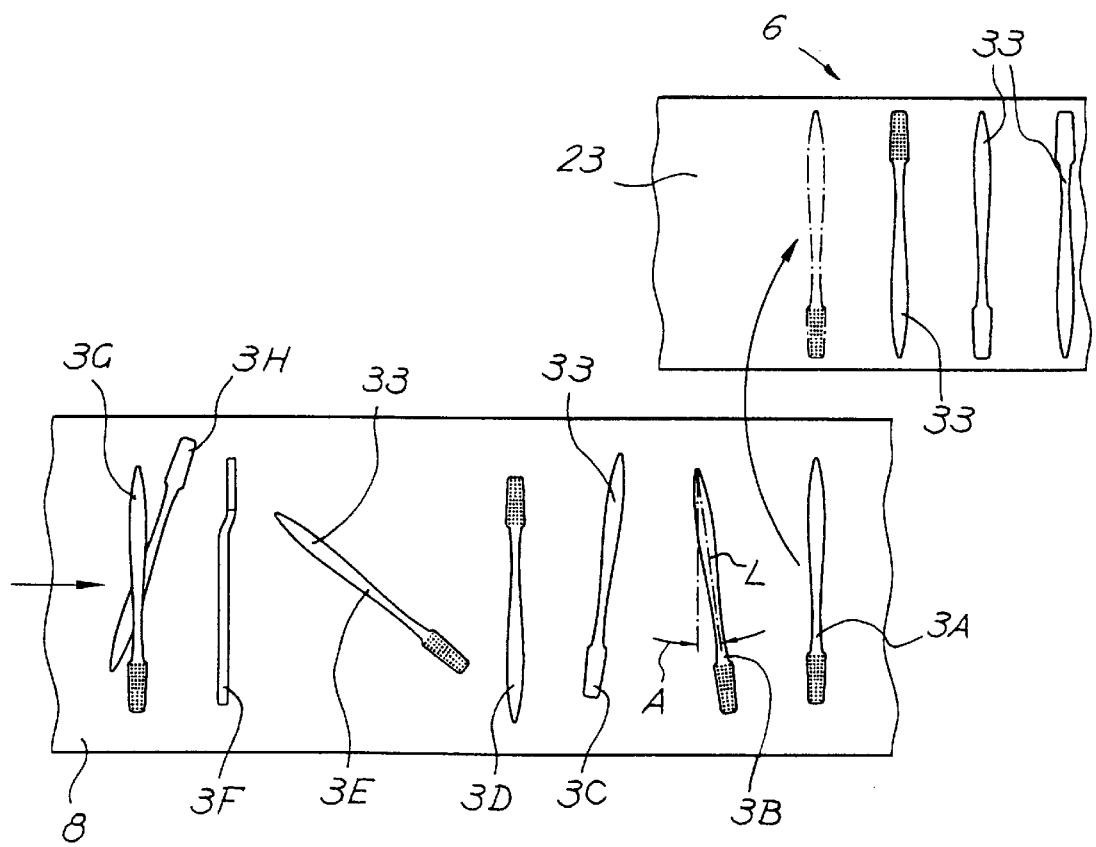
FIG. 5 represents a view according to arrow F5 in FIG. 1.

Practically, it is preferred that the toothbrush bodies 3, the longitudinal axis L of which is perpendicular or almost perpendicular to the direction of movement of the transport conveyor 8, are taken up by the manipulator 5, whereas the remaining toothbrush bodies 3 are transported further. In the example of FIG. 5, this means that the toothbrush bodies 3A, 3B, 3C, 3D, and 3F shall be taken up by the manipulator 5, whereas the toothbrush body 3E is not taken up as the direction of the longitudinal axis L thereof deviates too much from the perpendicular direction D. As a result thereof, a relatively simple manipulator 5 can be applied, consisting of a gripper 20 which is always positioned in the same direction and can perform only a transverse movement D and a movement H in the height.

It is noted that an additional criterion may consist in that exclusively toothbrush bodies 3 are taken up which are lying free in respect to the other toothbrush bodies 3. So, for example, in such case the toothbrush body 3G will not be taken up by the manipulator 5, as it is situated on top of a toothbrush body 3H.

When taking up the toothbrush bodies 3, the gripper 20 is placed over these toothbrush bodies 3 and is closed. The toothbrush bodies which are lying somewhat slanted, such as those indicated by 3B and 3C in FIG. 5, are automatically brought with their longitudinal axis L parallel to the transverse direction of the transport conveyor 8, by closing the gripper 20.

When positioning the gripper 20, this latter can be brought in the transverse direction D in different places above the transport conveyor 8 in order to obtain that the toothbrush bodies 3 are always gripped at such a location that, after being placed on the transport conveyor or such by the discharge means 6, they are lying with their extremities aligned. This can also be obtained by positioning the gripper 20 in the transverse direction when disposing the toothbrush bodies 3, instead of during gripping.

In the mechanism 24, the toothbrushes are placed with their handle 33 in the same direction, which, in FIG. 5, means that the toothbrush bodies 3D and 3F are reversed.

In the mechanism 25, the toothbrush bodies are placed with their backside in the same direction, for example, directed downward. This means that, in FIG. 5, the toothbrush body 3C, after being brought from the gripper 20 to the discharge means 6, shall be turned about 180° around its longitudinal axis L, in such a manner that this toothbrush body 3C is placed with the openings for the brush hair directed upward. The toothbrush body 3F which is lying on its lateral edge will be turned about 90° into the right direction. It is clear that a criterion for the selection may consist in that exclusively toothbrush bodies 3 are taken up which are lying flat, such as the toothbrush bodies 3A-3B-3C-3D in FIG. 5, as a result of which the mechanism 25 exclusively must be able to perform a turning movement of 180°.

In FIG. 3, it is indicated schematically that a buffer 34 may be provided in the discharge means 6 in order to compensate eventual irregularities in the discharge of the arranged toothbrush bodies 3.

In the represented example, the device 1 is coupled to a brush manufacturing machine 35.

The same device 1 may be applied for sorting toothbrush bodies already provided with brush hair, in other words, finished toothbrushes, in order to supply them to a packaging machine instead of a brush manufacturing machine 35.

It is noted that the discharge means 6, in the case of a brush manufacturing machine 35, may consist of a holder of this machine 35, in such a manner that no intermediate transport conveyor is necessary. In the case of a packaging maching, the discharge means 6 may also consist of still open packages which are transported along the device 1 and into which the toothbrushes are disposed directly, by means of the manipulator 5.

As explained in the introduction, when using a more complex manipulator 5, one or more of the operations performed by the mechanisms 24 and 25 may also be performed by this manipulator, as a result of which the mechanisms 24 and/or 25 will be omitted.

The sorting element must not necessarily consist of a manipulator 5. According to a variant, a movable flap or such may be provided at the end of the transport conveyor 8 which flap, in a first position, provides for that toothbrush bodies 3 or toothbrushes which are lying free will slide over the flap and, one by one, come into a collector system, whereas this flap, in a second position, provides for that toothbrush bodies 3 which are not lying sufficiently separated from each other, will be brought under this flap in order to be fed back, for example, by means of the transport conveyor 29.

It is clear that the arranging of the toothbrush bodies can be combined with other sorting actions, such as a sorting in function of the color in case that brush bodies with different colors are supplied. Preferably, however, the method is free of such additional sorting action, as a sorting in function of the color by means of a vision system is complex and requires additional calculation time, which may slow down the capacity of the device.

The present invention is in no way limited to the form of embodiment represented in the figures, on the contrary may such method and device for arranging, toothbrush bodies, toothbrushes, respectively, be realized in different variants without leaving the scope of the invention.

What is claimed is:

1. Method for arranging toothbrush bodies, which toothbrush bodies (3) either or not are already provided with brush hair, wherein this method at least comprises the steps of supplying the toothbrush bodies (3) to be arranged; detecting the position of the supplied toothbrush bodies (3) by means of a visual recognition system (4); controlling a sorting element in function of the detections performed by the recognition system (4); and separating, by means of this sorting element, at least a number of the toothbrush bodies (3), as well as arranging them at least partially ordered in discharge means (6);

further wherein the sorting element is controlled in such a manner that it separates exclusively the toothbrush bodies (3) which either fulfil one of the following criteria, or a combination of two or more of the following criteria:

toothbrush bodies (3) which are situated such that the longitudinal axis (L) thereof shows a direction which is parallel to a predetermined direction or shows only a certain angular deviation (A) in respect to this predetermined direction;

toothbrush bodies (3) which are lying free in respect to the other toothbrush bodies (3);

toothbrush bodies (3) which are lying flat, in other words, on their bottom or top side.

2. Method for arranging toothbrush bodies, which toothbrush bodies (3) either or not are already provided with brush hair, wherein this method at least comprises the steps of supplying the toothbrush bodies (3) to be arranged; detecting the position of the supplied toothbrush bodies (3) by means of a visual recognition system (4); controlling a sorting element in function of the detections performed by the recognition system (4); and separating, by means of this sorting element, at least a number of the toothbrush bodies (3), as well as arranging them at least partially ordered in discharge means (6);

further wherein, for the sorting element, use is made of a manipulator (5); and further wherein by means of the movement of the manipulator (5), where it is necessary, one or more of the following operations are performed:

turning the gripped toothbrush body (3D-3F) according to an axis perpendicular to the longitudinal axis (L) of this toothbrush body (3D-3F), in such a manner that all toothbrush bodies (3A-3B-3C-3D-3F) treated by the manipulator (5) are oriented with their handles (33) in one and the same direction;

turning the gripped toothbrush body (3C-3F) around its longitudinal axis (L), in such a manner that all toothbrush bodies (3A-3B-3C-3D-3F) treated by the manipulator (5) are placed with their backside in the same direction;

gripping the toothbrush bodies (3) by means of the manipulator (5) at different locations along the longitudinal axis (L) and/or positioning the manipulator (5) at different locations when disposing the toothbrush bodies (3) again, in such a manner that they are put down in an aligned manner.

3. A method for arranging elongate toothbrush bodies for further processing, comprising:

depositing in random order onto a surface toothbrush bodies transported from a source, wherein the random order that may include overlapping toothbrush bodies, toothbrush bodies disposed with their longitudinal orientations disposed at various angles relative to a predetermined desired orientation angle, and toothbrush bodies disposed other than flat on their back side;

viewing the toothbrush bodies deposited on the surface by means of a visual recognition system that outputs signals representative of the positions of the toothbrush bodies on the surface;

providing a sorting device controlled by said signals, said sorting device arranged to pick up toothbrush bodies from said surface; and actuating the sorting device to take up from the surface for further processing only those toothbrush bodies which are oriented in positions that meet predetermined criteria.

4. The method as claimed in claim 3, wherein said surface is a moving conveyor, including the step of moving the deposited toothbrush bodies in random order relative to the visual recognition system, and carrying out the actuation of the sorting device to take up the toothbrush bodies from the surface by picking up those toothbrush bodies which are oriented in positions meeting said predetermined criteria.

5. The method as claimed in claim 4, including carrying out the step of taking up the toothbrush bodies which are oriented in positions meeting said predetermined criteria by moving them to another moving conveyor.

6. The method as claimed in claim 4, including transporting by the conveyor those toothbrush bodies that are not taken up from the conveyor by the sorting device to a return device arranged to return the transported toothbrush bodies to the source of toothbrush bodies.

7. The method as claimed in claim 4, including dropping toothbrush bodies onto said moving conveyor from said source.

8. The method as claimed in claim 3, including using an electronic vision system including a camera for said visual recognition system.

9. The method as claimed in claim 3, including the additional step of further orienting the toothbrush bodies after they have been taken up from the surface by the sorting device.

10. The method as claimed in claim 9, said toothbrush bodies including handles, and wherein during said further orienting step said handles are oriented in the same direction.

11. The method as claimed in claim 9, including during said further orienting, said toothbrush bodies are placed on a surface with their backsides extending in the same orientation and direction.

12. The method as claimed in claim 3, wherein said sorting device is a manipulator arranged to engage and manipulate toothbrush bodies; said manipulator is arranged to place said toothbrush bodies in a correct end position upon taking up the toothbrush bodies from said surface, and is arranged to carry-out limited manipulating functions requiring said toothbrush bodies to be arranged in positions meeting said predetermined criteria before the manipulator may take up the toothbrush bodies from said surface and place them in said correct end position.

13. The method as claimed in claim 3, wherein said sorting device is a toothbrush body manipulator arranged to carry-out manipulations selected from the group consisting of:
- turning a toothbrush body relative to an axis perpendicular to the longitudinal axis of the toothbrush body whereby the toothbrush body may be oriented in either of two opposite directions;
- turning the toothbrush body about its longitudinal axis such that the toothbrush body may be placed with its backside in a selected direction;
- engaging toothbrush bodies at different locations along the longitudinal axis of the toothbrush bodies and moving the toothbrush bodies to a different location whereby toothbrush bodies may be placed at said different location in aligned condition.

14. The method as claimed in claim 13, including using said manipulator that includes a gripper that may be opened and closed, positioned sidewards and moved towards and away from the toothbrush bodies.

15. Apparatus for arranging elongate toothbrush bodies for further processing comprising:
- a bulk supply source of toothbrush bodies in random orientation and position;
- a toothbrush body deposit device arranged to transport toothbrush bodies from the supply source to a position that is elevated relative to a surface and to deposit transported toothbrush bodies onto such surface in random order;
- an electronic visual recognition system arranged to view the surface and toothbrush bodies deposited thereon by said deposit device, and to provide signals representative of the position of toothbrush bodies deposited on said surface;
- a sorting device arranged to receive said signals from said visual recognition system and to remove from the surface only those toothbrush bodies that are oriented in positions that meet predetermined criteria.

16. Apparatus as claimed in claim 15, said toothbrush body deposit device comprising a first conveyor having a discharge end and arranged to receive toothbrush bodies in random orientation from the toothbrush body service; said surface comprising a second conveyor moving underneath the discharge end of said deposit device.

17. Apparatus as claimed in claim 16, including a third conveyor arranged adjacent said second conveyor and further arranged to receive toothbrush bodies removed from said second conveyor device by said sorting device.

18. Apparatus as claimed in claim 16, wherein said sorting device is capable only of moving toothbrush bodies engaged by said gripper upwardly away from said surface and linearly approximately parallel to said surface.

19. Apparatus as claimed in claim 16, including a second sorting device associated with and located adjacent said third conveyor, said second sorting device arranged to re-orient toothbrush bodies placed on said second conveyor by the first recited sorting device.

20. Apparatus as claimed in claim 15, wherein said sorting device comprises a manipulator including a gripper adapted to engage, grip and move only toothbrush bodies that are located in positions meeting said predetermined criteria.

21. Method for arranging toothbrush bodies, which toothbrush bodies (3) either or not are already provided with brush hair, wherein this method at least comprises the steps of supplying the toothbrush bodies (3) to be arranged; detecting the position of the supplied toothbrush bodies (3) by means of a visual recognition system (4); controlling a sorting element in function of the detections performed by the recognition system (4); and separating, by means of this sorting element, at least a number of the toothbrush bodies (3), as well as arranging them at least partially ordered in discharge means (6);
- further wherein the sorting element is controlled in such a manner that it separates at least toothbrush bodies (3) which either fulfil one of the following criteria, or a combination of two or more of the following criteria:
- toothbrush bodies (3) which are situated such that the longitudinal axis (L) thereof shows a direction which is parallel to a predetermined direction or shows only a certain angular deviation (A) in respect to this predetermined direction;
- toothbrush bodies (3) which are lying free in respect to the other toothbrush bodies (3);
- toothbrush bodies (3) which are lying flat, in other words, on their bottom or top side.

* * * * *